United States Patent
Motonaga (10) Patent No.: US 8,668,423 B2
(45) Date of Patent: Mar. 11, 2014

(54) GRASPING DEVICE, ROBOT SYSTEM, AND METHOD OF MANUFACTURING MECHANICAL PRODUCT

(75) Inventor: Kenichi Motonaga, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 666 days.

(21) Appl. No.: 12/968,295

(22) Filed: Dec. 15, 2010

(65) Prior Publication Data

US 2011/0217154 A1 Sep. 8, 2011

(30) Foreign Application Priority Data

Mar. 4, 2010 (JP) ................................. 2010-048248

(51) Int. Cl.
*B65H 1/00* (2006.01)
(52) U.S. Cl.
USPC ...... 414/225.01; 414/729; 414/730; 414/741; 29/468; 29/559; 901/15; 901/31
(58) Field of Classification Search
USPC ......... 414/225.01, 729, 730, 741; 901/15, 31; 29/468, 559
See application file for complete search history.

(56) References Cited

U.S. PATENT DOCUMENTS

| | | | |
|---|---|---|---|
| 3,226,833 A * | 1/1966 | Lemelson | 33/783 |
| 3,682,327 A * | 8/1972 | Winne | 414/741 |
| 4,336,926 A * | 6/1982 | Inagaki et al. | 269/34 |
| 4,423,998 A * | 1/1984 | Inaba et al. | 414/730 |
| 8,449,240 B2 * | 5/2013 | Priepke et al. | 414/704 |
| 2012/0175903 A1 * | 7/2012 | Murakami et al. | 294/207 |

FOREIGN PATENT DOCUMENTS

| | | |
|---|---|---|
| DE | 19613901 | 10/1997 |
| JP | 8039474 | 2/1996 |
| JP | 08-174465 | 7/1996 |
| JP | 11-010577 | 1/1999 |
| JP | 2003-266252 | 9/2003 |
| JP | 2009-034810 | 2/2009 |
| JP | 2009-045687 | 3/2009 |
| WO | WO 2009/124656 | 10/2009 |

OTHER PUBLICATIONS

Extended European Search Report for corresponding EP Application No. 11150320.7-2316, Jun. 8, 2011.
Japanese Office Action for corresponding JP Application No. 2010-048248, May 15, 2013.

* cited by examiner

*Primary Examiner* — Prasad Gokhale
(74) *Attorney, Agent, or Firm* — Ditthavong Mori & Steiner, P.C.

(57) ABSTRACT

A grasping device includes a first member, a fixed member fixed to the first member, a first finger member fixed to one end of the first member, a slide mechanism fixed to the first member, a first slider member slidably attached to the slide mechanism, a second member fixed to the first slider member at one end thereof, a guide mechanism fixed to the second member, a second slider member slidably attached to the guide mechanism, a second finger member fixed to the second slider member, and a displacement increasing mechanism that transmits a relative displacement between the fixed member and the first slider member to the second slider member.

9 Claims, 6 Drawing Sheets

GRASPING DEVICE, ROBOT SYSTEM, AND METHOD OF MANUFACTURING MECHANICAL PRODUCT

CROSS-REFERENCE TO RELATED APPLICATION

The present application claims priority under 35 U.S.C. §119 to Japanese Patent Application No. 2010-048248, filed Mar. 4, 2010. The contents of the application are incorporated herein by reference in their entirety.

BACKGROUND OF THE INVENTION

1. Field of the Invention

The present invention relates to a grasping device, a robot system, and a method of manufacturing a mechanical product.

2. Description of the Related Art

As robots have been used in recent years for a variety of uses including a cellular manufacturing system, it has been required for a robot to be equipped with a hand unit that can hold objects having various shapes. Moreover, it is also required for the robot to hold the same object in various ways.

When a robot has a hand unit including a holder mechanism, such as an air chuck, that can hold an object in a limited way, it is necessary for the robot to have a plurality of air chucks each corresponding to one way of holding the object and to change the air chucks by using an automatic tool changer. As a result, the cost of the hand unit is increased.

Japanese Patent Laid-Open Publication No. 2009-034810, for example, discloses a mechanism that includes a pair of finger members and holds an object by increasing and decreasing the distance between the finger members. Such a mechanism has been widely used. Various types of objects can be held and handled by using such a hand unit.

SUMMARY OF THE INVENTION

According to one aspect of the present invention, a grasping device includes a first member, a fixed member fixed to the first member, a first finger member fixed to one end of the first member, a slide mechanism fixed to the first member, a first slider member slidably attached to the slide mechanism, a second member fixed to the first slider member at one end thereof, a guide mechanism fixed to the second member, a second slider member slidably attached to the guide mechanism, a second finger member fixed to the second slider member, and a displacement increasing mechanism that transmits a relative displacement between the fixed member and the first slider member to the second slider member.

According to another aspect of the present invention, a method of manufacturing a mechanical product includes preparing a robot including a grasping device, preparing a storage unit inside the fence, the storage unit storing a plurality of types of objects, preparing a workspace inside the fence, the workspace being a space where the robot assembles the plurality of types of objects, and transferring the objects from the storage unit to the workspace by grasping each of the objects by using the robot.

BRIEF DESCRIPTION OF THE DRAWINGS

The present invention will be described in further detail with reference to the accompanying drawings wherein.

DETAILED DESCRIPTION OF THE EMBODIMENTS

Hereinafter, an embodiment of the present invention will be described with reference to the drawings.

In the present embodiment, a mechanical product manufacturing system 100 is used as an example to which the present invention is applied. The mechanical product manufacturing system 100 makes a part or the entirety of a mechanical product by machining and assembling three types of workpieces W (objects).

Figure 1:
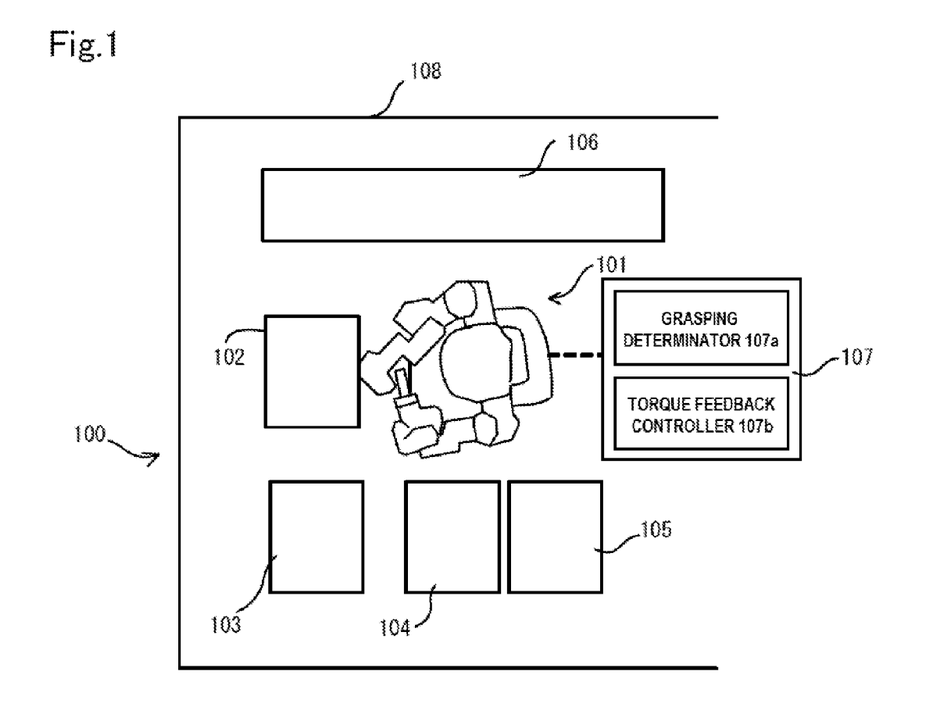
FIG. 1 is a schematic view illustrating the overall structure of an embodiment.

As illustrated in FIG. 1, the mechanical product manufacturing system 100 (robot system) according to the present embodiment includes a robot 101 (robot device), a stage 102 (workspace), workpiece storage units 103 to 105 (storage unit), a conveyer belt 106, a control device 107 (which serves as a controller and a robot controller), and a fence 108. The mechanical product manufacturing system 100 is installed on a floor of a factory in an area surrounded by the fence 108. The robot 101 and other automated machines are disposed inside the fence 108.

The stage 102 is a flat table that is disposed in front of the robot 101 (at a position among the first arm, second arm, and a body, which will be described below). A plurality of jigs (not shown), which are used for positioning the workpiece or the like, are disposed on the stage 102. The workpiece storage units 103 to 105 respectively store different types of electric circuit boards (hereinafter, referred to as workpieces W), each in multiple quantities. Each of the workpieces W has a plate-like shape that is thin in the up-down direction. Electric wiring and electronic components such as capacitors have been mounted on or to be mounted on the upper surface or on the lower surface of the workpiece W. The workpiece storage units 103 to 105 each may be a fixed shelf or may be a vehicle or a conveyer that transfers the workpieces W to the mechanical product manufacturing system 100.

The robot 101 assembles the workpieces W to make a mechanical product. For simplicity, an example using three types of workpieces W is described here. However, the number of types of workpiece may be appropriately changed in accordance with the assembly operation of the workpieces W. The control device 107 is a computer including a memory (not shown), a processor (not shown), and an input device (not shown). The controller is communicatively connected to the robot 101 and to left and right hand units 61 and 62. Actuators and driving motors 5 (see FIGS. 2 and 3, and other figures) of the robot 101 are driven on the basis of command signals sent from the control device 107.

The control device 107 includes, as a functional unit, a grasping determiner 107a that determines whether or not the workpiece W is grasped (gripped) by claws 8a and 8b on the basis of the magnitude of a torque that is applied to the driving motor 5. To be specific, as the distance between the claws 8a and 8*b* is decreased, the magnitude of the torque applied to the driving motor 5 increases sharply when the claws 8*a* and 8*b* grasp the workpiece W. On the basis of this change in the magnitude of the torque, whether or not the workpiece W is grasped is determined. When it is determined that the workpiece W is grasped by the claws 8*a* and 8*b*, the control device 107 performs feedback control, using a torque feedback controller 107*b*, on the driving motor 5 in accordance with the grasping force (torque) so that the workpiece W is grasped with a grasping force (torque) having an appropriate magnitude that has been stored in the memory as taught data.

Robot

Figure 2:
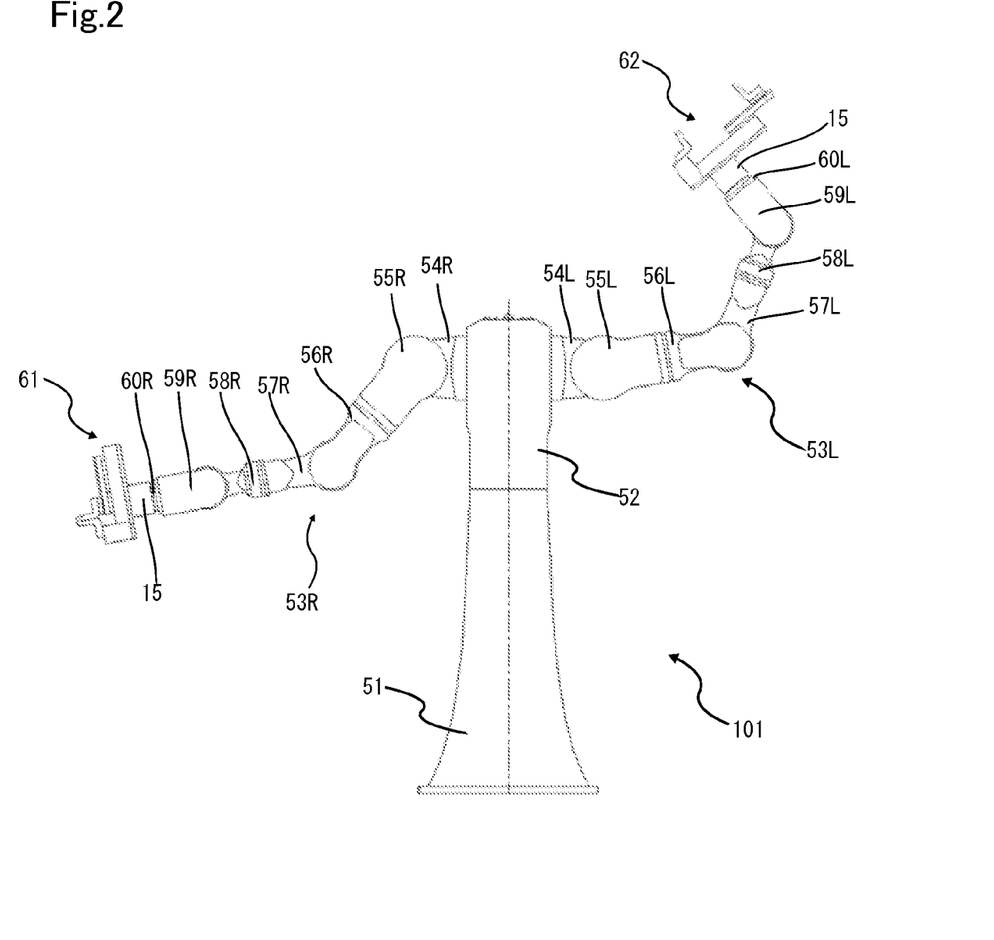
FIG. 2 is a schematic side view illustrating the structure of a robot.

Next, the structure of the robot 101 will be described. As illustrated in FIG. 2, the robot 101 has a base 51 that is fixed to the floor with anchor bolts (not shown). A body 52 is turnably mounted on the base 51 with an actuator therebetween. A right arm 53R (arm) and a left arm 53L (arm) are respectively disposed on the right side and on the left side of the body 52. The right arm 53R includes a right shoulder 54R (first structural member), which is turnable parallel to a horizontal surface (that is parallel to the floor). A right upper arm A-portion 55R (arm member) is attached to the right shoulder 54R in a swingable manner. A right upper arm B-portion 56R (arm member) is attached to an end of the right upper arm A-portion 55R (arm member). The right upper arm B-portion 56R turns to perform twisting operation.

A right lower arm 57R (arm member) is attached to an end of the right upper arm B-portion 56R in a swingable manner. A right wrist A-portion 58R (arm member) is attached to an end of the right lower arm 57R, and a right wrist B-portion 59R (arm member) is attached to an end of the right wrist A-portion 58R. The right wrist A-portion 58R turns to perform twisting operation, and the right wrist B-portion 59R turns to perform bending operation. A right flange 60R is attached to an end of the right wrist B-portion 59R. The right hand unit 61 (hand unit) is attached to the right flange 60R with a bracket 15 therebetween. The right flange 60R is rotated by a servo motor, and thereby the right hand unit 61 can be moved and stopped (positioned) at a position commanded by the control device 107.

The left arm 53L and the right arm 53R are horizontally symmetric. The left arm 53L includes a left shoulder 54L, a left upper arm A-portion 55L, a left upper arm B-portion 56L, a left lower arm 57L, a left wrist A-portion 58L, a left wrist B-portion 59L, and a left flange 60L. The left hand unit 62 (hand unit) is attached to the left flange 60L with the bracket 15 therebetween.

Hand Unit

Figure 3A:
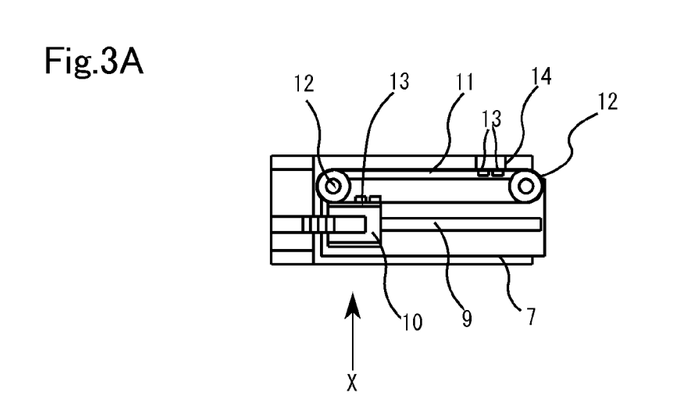
FIG. 3A is a top view of a hand.
Figure 3B:
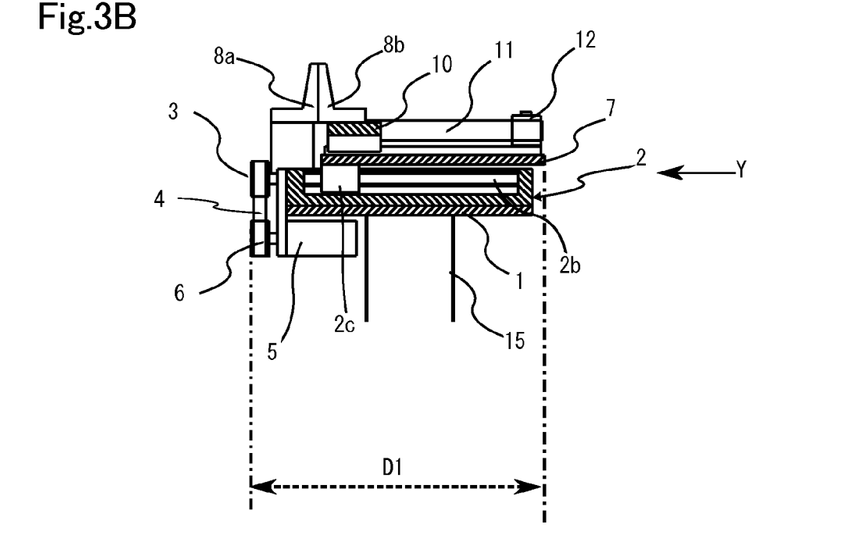
FIG. 3B is a schematic view of the hand viewed in the direction of arrow X of FIG. 3A.
Figure 3C:
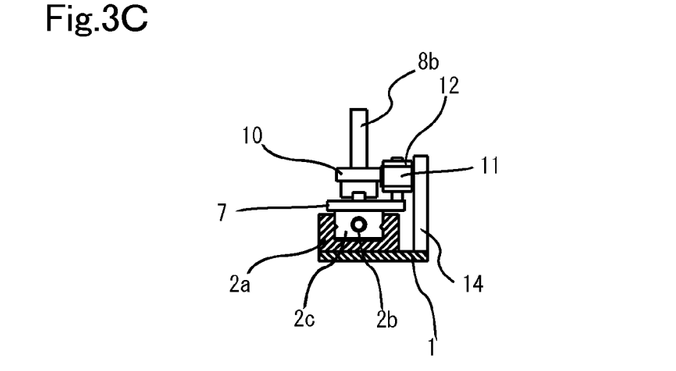
FIG. 3C is a schematic view of the hand viewed in the direction of arrow Y of FIG. 3B.

The left and right hand units 61 and 62 have the same structure. As illustrated in FIGS. 3A to 3C, each of the left and right hand units 61 and 62 includes a fixed base 1 (first member), a linear guide actuator 2 (slide mechanism), a pulley 3, a timing belt 4, the driving motor 5 (actuator), a pulley 6, a first slider 7 (second member), the pair of claws 8*a* and 8*b* (first and second finger members), a linear guide 9 (guide mechanism), a second slider 10 (second slider member), a steel belt 11 (endless belt), a pair of rollers 12, screws 13, and a strut 14 (fixed member). The steel belt 11, the pair of rollers 12, the screws 13, and the strut 14 constitute a displacement increasing mechanism.

The fixed base 1 is a flat plate that is fixed to the bracket 15. The longitudinal direction of the fixed base 1 is the same as the direction in which the pair of claws 8*a* and 8*b* are opened and closed. The linear guide actuator 2 is fixed to the fixed base 1. The linear guide actuator 2 is an assembly including a linear guide 2*a*, a ball screw 2*b*, and a slider base 2*c* (first slider member). The linear guide 2*a* is fixed to the fixed base 1, and rotatably supports the ball screw 2*b*, which extends from one end to the other end of the fixed base 1. The ball screw 2*b* is inserted through the slider base 2*c* so that, when the ball screw 2*b* rotates, the slider base 2*c* slides along the shaft of the ball screw 2*b*.

The pulley 3 is attached to the shaft of the ball screw 2*b*. The pulley 3 is connected to the pulley 6, which is attached to the shaft of the driving motor 5, through the timing belt 4. Alternatively, the shaft of the ball screw 2*b* may be directly connected to the driving motor 5. The driving motor 5 is a servo motor including an encoder. The driving motor 5 is electrically connected to the control device 107, and controlled by the control device 107. The claw 8*a* is fixed to the fixed base 1 at a position near an end (one end) of the fixed base 1. The strut 14 is fixed to the fixed base 1 at a position near the other end of the fixed base 1.

The first slider 7 is fixed to the slider base 2*c* of the linear guide actuator 2. As the slider base 2*c* slides, the first slider 7 slidingly moves relative to the fixed base 1. The linear guide 9 is fixed to an upper surface of the first slider 7. The linear guide 9 extends from one end to the other end of the upper surface of the first slider 7. The second slider 10 is disposed on the linear guide 9 so as to be slidable along the linear guide 9.

The claw 8*b* is disposed on the second slider 10. The two rollers 12 are disposed on respective end portions of the first slider 7 in the longitudinal direction. The steel belt 11, which is an endless belt, is looped over the rollers 12. The steel belt 11 is fixed to the second slider 10 with a screw 13 (or a different type of fastener). The steel belt 11 is fixed to the strut 14 with a screw 13 at the midpoint of the steel belt 11 with respect to the other screw 13 (near a position that is point symmetric to the other screw 13).

Figure 5A:
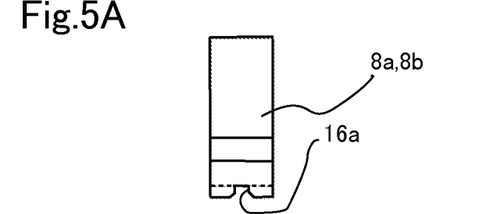
FIGS. 5A, 5B, and 5C are schematic views illustrating the shape of a finger member.
Figure 5B:
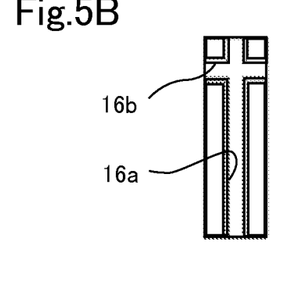
Figure 5C:
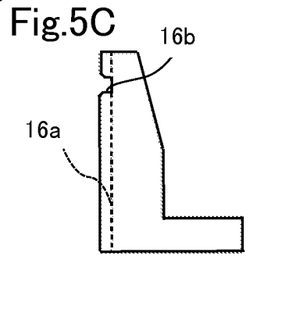
Figure 6A:
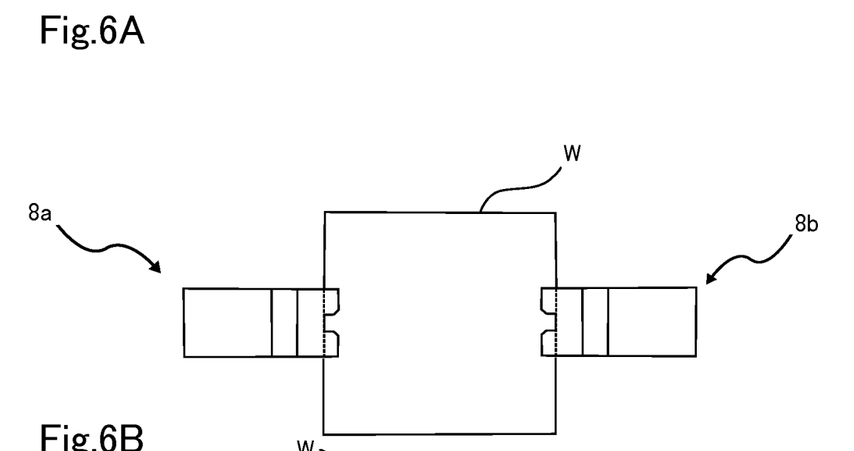
FIGS. 6A and 6B are schematic views illustrating the ways of grasping a workpiece according to the embodiment.
Figure 6B:
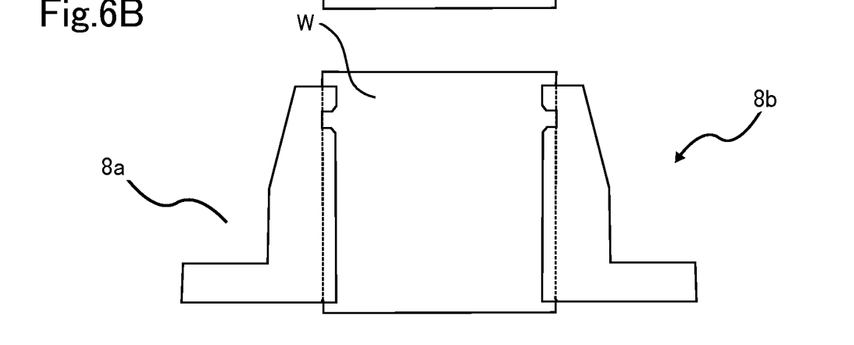

The claws 8*a* and 8*b* have the same structure. As illustrated in FIGS. 5A, 5B, and 5C, a first groove 16*a* is formed in each of the claws 8*a* and 8*b*. The first groove 16*a* is configured so that a side portion (edge in the thickness direction) of the workpiece W can be inserted thereinto. The first groove 16*a* extends in the longitudinal direction of the claws 8*a* and 8*b*. A second groove 16*b* is formed in each of the claws 8*a* and 8*b* at a position near an end of each of the claws 8*a* and 8*b*. The second groove 16*b* extends in a direction perpendicular to the first groove 16*a*. Thus, as illustrated in FIG. 6A, the claws 8*a* and 8*b* can grasp the workpiece W that is oriented in a direction perpendicular to the longitudinal direction of the claws 8*a* and 8*b*. Moreover, as illustrated in FIG. 6B, the claws 8*a* and 8*b* can grasp the workpiece W that is oriented parallel to the longitudinal direction of the claws 8*a* and 8*b*. In either case, the workpiece W can be reliably grasped and transferred without being displaced.

The control device 107 is taught beforehand to control the actuators and the driving motors 5 of the robot 101 so that the robot 101 grasps the workpiece W by engaging the first grooves 16*a* or the second grooves 16*b* with the side portions of the workpiece W. Alternatively, depending on the state of the workpiece W, the control device 107 may be taught so that the robot 101 grasps the workpiece W by clamping the upper surface and the lower surface of the workpiece W with the claws 8*a* and 8*b*. That is, when handling the workpiece W on which electronic components are mounted, it is necessary to prevent the claws 8*a* and 8*b* from contacting the electronic components on the upper surface or the lower surface of the workpiece W. In this case, by grasping the side portions of the workpiece W with the claws 8*a* and 8*b*, the workpiece W can be grasped while preventing the claws 8*a* and 8*b* from interfering with electronic components that are mounted on the workpiece W. If electronic components have not been mounted on the workpiece W, the workpiece W may be grasped by clamping the upper surface and the lower surface of the workpiece. In this case, the workpiece W can be more securely grasped because a larger area can be grasped.

Each of the hand units 61 and 62 according to the present embodiment is structured as described above. Therefore, when the driving motor 5 rotates, the pulley 6 that is attached to the driving motor 5 rotates, and the pulley 3 is rotated by the timing belt 4. Then, the ball screw of the linear guide actuator 2 is rotated, and the first slider 7 slides along the linear guide 2a of the linear guide actuator 2.

Figure 4A:
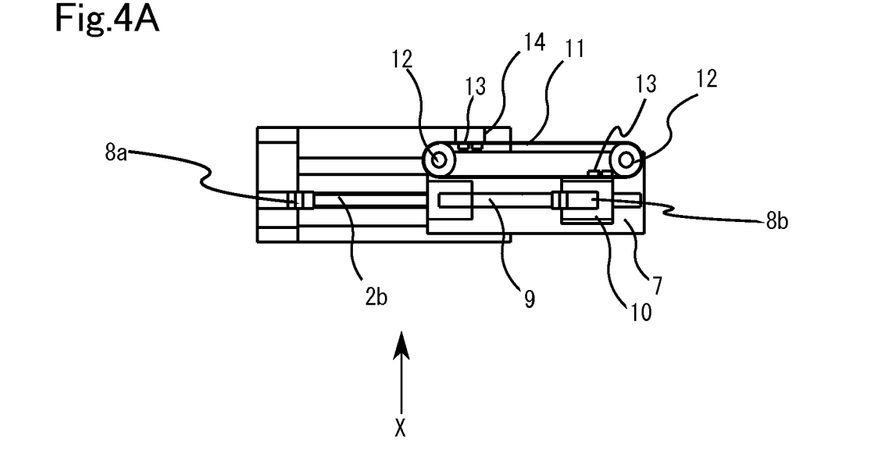
FIG. 4A is a top view of the hand.
Figure 4B:
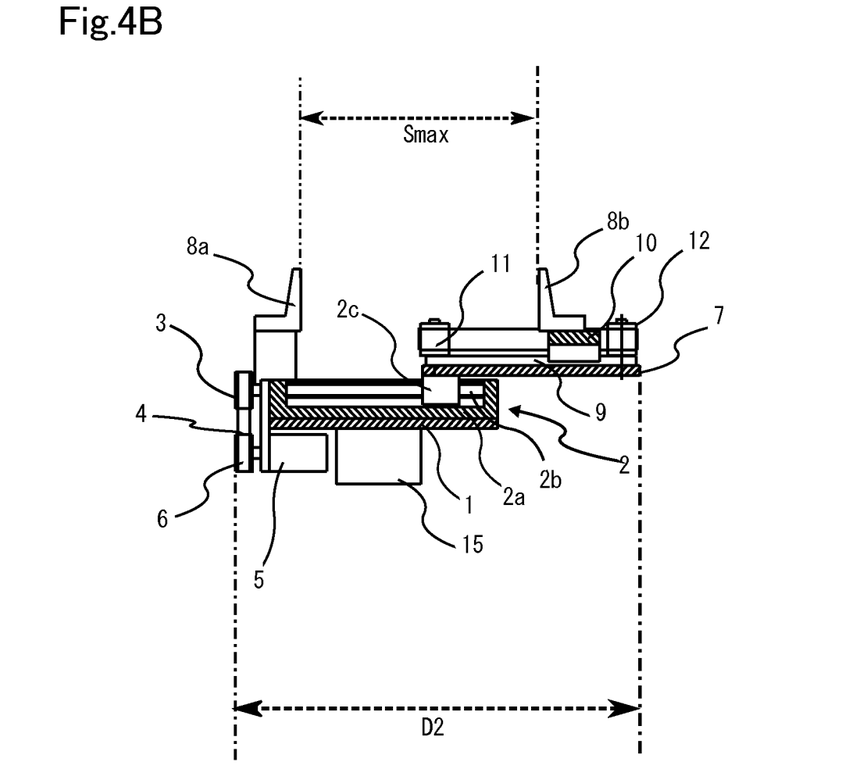
FIG. 4B is a schematic view of the hand viewed in the direction of arrow Z of FIG. 4A.

The steel belt 11 is looped over the two rollers 12 that are fixed to the first slider 7. Moreover, the steel belt 11 is fixed to the second slider 10 and the strut 14 with the screws 13, and the strut 14 is fixed to the fixed base 1. Therefore, as the first slider 7 slides, the second slider 10 is pulled by the steel belt 11 and is moved a distance that is the same as the distance that the first slider 7 moves. Accordingly, as illustrated in FIGS. 4A and 4B, the claw 8b slides a distance that is double the distance that the first slider 7 moves from the initial position at which the claws 8a and 8b are closed.

In the mechanical product manufacturing system according to the present embodiment, when the claws 8a and 8b are in contact with each other, i.e., when the distance S (stroke) between the claws 8a and 8b is the smallest, the fixed base 1 and the first slider 7 almost completely overlap as illustrated in FIGS. 3A and 3B. Therefore, the length D1 of each of the hand units 61 and 62 along the stroke of the claws 8a and 8b can be made smaller than the length D2 of each of the hand units 61 and 62 when the distance (stroke) S between the claws 8a and 8b is the largest.

In other words, each of the hand units 61 and 62 has a moving range from 0 to Smax, and is capable of grasping the workpieces W having various shapes and sizes. Moreover, the smallest length of each of the hand units 61 and 62 (here, D1) can be made small relative to the maximum stroke Smax. Thus, even when the storage units 103 to 105 and the robot 101 are densely arranged inside the fence 108, the size of each of the hand units 61 and 62 can be reduced by decreasing the distance between the claws 8a and 8b of each of the hand units 61 and 62, whereby interference between the robot 101 and obstacles inside the fence 108 can be reduced and the degree of freedom of the motion of the robot 101 and the hand units 61 and 62 can be increased.

Moreover, in the present embodiment, both the linear guide actuator 2 and the steel belt 11 can be driven by the driving motor 5. Therefore, as compared with a structure in which a plurality of linear guide actuators are stacked so as to be extended and contracted in two steps, cables for motors can be simply routed, so that the hand units 61 and 62 that are light in weight can be made at a low cost.

A positioning mechanism used in the present invention is not limited to that of the embodiment described above, and can be appropriately modified within the spirit and the scope of the present invention. For example, in the embodiment described above, the ball screw is rotated by the driving motor. However, a linear motor may be used as the actuator. The disposition of the actuator is not limited to that of the embodiment. The actuator may be disposed at an appropriated position as long as the actuator can increase and decrease the distance between the pair of finger members. For example, the driving motor, the pulley, and the like may be omitted from the embodiment, a simple guide member may be used instead of the ball screw, and the rollers may be rotated by a motor or the like so as to move the second finger member. In this case, the steel belt is rotated between the rollers, and a relative displacement between the steel belt and the strut is transmitted to other members.

What is claimed is:

1. A grasping device comprising:
   a first member;
   a fixed member fixed to the first member;
   a first finger member fixed to one end of the first member;
   a slide mechanism including a guide that is fixed to the first member, and a first slider member slidably attached to the guide;
   a second member fixed to the first slider member at one end thereof;
   a guide mechanism fixed to the second member;
   a second slider member slidably attached to the guide mechanism;
   a second finger member fixed to the second slider member; and
   a displacement increasing mechanism that transmits a relative displacement between the fixed member and the first slider member to the second slider member.

2. The grasping device according to claim 1,
   wherein the slide mechanism includes
      a ball screw extending from one end to the other end of the first member, and
      an actuator that drives the ball screw, and
   wherein the first slider member is attached to the ball screw.

3. The grasping device according to claim 2, further comprising:
   a controller that controls driving of the actuator,
   wherein the actuator is a servo motor, and,
   wherein the controller includes
      a grasping determiner that determines whether or not an object is grasped by the first finger member and the second finger member on the basis of a magnitude of a torque applied to the actuator, and
      a torque feedback controller that performs control so that the grasping device grasps the object with a predetermined grasping force when the grasping determiner determines that the object is being grasped.

4. The grasping device according to claim 2,
   wherein the object is a circuit board having electric wiring on at least one of an upper surface and a lower surface thereof, and
   wherein a controller controls the actuator so that the first finger member and the second finger member grasp side portions of the circuit board.

5. The grasping device according to claim 1,
   wherein the displacement increasing mechanism includes
      a pair of rollers fixed to the first slider member, and
      an endless belt looped over the pair of rollers,
   wherein the endless belt is connected to the second slider member and the fixed member.

6. The grasping device according to claim 1,
   wherein a first groove and a second groove are formed in each of the first finger member and the second finger member, the first groove extending in a direction in which the first and second finger members extend, the second groove extending in a direction perpendicular to the first groove.

7. A robot system comprising:
   a base installed on an installation surface;
   an arm connected to the base, the arm including a plurality of arm members each of which being rotatable and/or turnable; and
   a grasping device attached to the arm, the grasping device including
      a first member,
      a fixed member fixed to the first member, a first finger member fixed to one end of the first member, a slide mechanism including a guide that is fixed to the first member, and a first slider member slidably attached to the guide, a second member fixed to the first slider member at one end thereof, a guide mechanism fixed to the second member, a second slider member slidably attached to the guide mechanism, a second finger member fixed to the second slider member, and a displacement increasing mechanism that transmits a relative displacement between the fixed member and the first slider member to the second slider member.

8. The robot system according to claim 7, further comprising:

a storage unit that stores a plurality of types of objects;

a workspace in which assembly operation is performed on the plurality of types of objects; and a fence that surrounds the base, the storage unit, and the workspace.

9. A method of manufacturing a mechanical product comprising:

preparing a robot including a grasping device, the grasping device including a first member, a fixed member fixed to the first member, a first finger member fixed to one end of the first member, a slide mechanism including a guide that is fixed to the first member, and a first slider member slidably attached to the guide, a second member fixed to the first slider member at one end thereof, a guide mechanism fixed to the second member, a second slider member slidably attached to the guide mechanism, a second finger member fixed to the second slider member, and a displacement increasing mechanism that transmits a relative displacement between the fixed member and the first slider member to the second slider member;

preparing a storage unit inside the fence, the storage unit storing a plurality of types of objects;

preparing a workspace inside the fence, the workspace being a space where the robot assembles the plurality of types of objects; and transferring the objects from the storage unit to the workspace by grasping each of the objects by using the robot.

* * * * *